United States Patent [19]

Renz

[11] Patent Number: 5,430,746
[45] Date of Patent: Jul. 4, 1995

[54] METHOD OF AND CIRCUITRY FOR DETECTING SYNCHRONISM FAILURE OF TWO WORD SEQUENCES

[75] Inventor: Günter Renz, Pfullingen, Germany

[73] Assignee: Wandel & Goltermann GmbH & Co. Elektronische Messtechnik, Eningen u.A., Germany

[21] Appl. No.: 149,014

[22] Filed: Nov. 8, 1993

Related U.S. Application Data

[63] Continuation of Ser. No. 896,129, Jun. 9, 1992, abandoned.

[51] Int. Cl.$^6$ .............................................. G06F 11/00
[52] U.S. Cl. ................................... 371/47.1; 371/42; 371/46; 371/5.4; 375/357
[58] Field of Search ................ 371/47.1, 42, 46, 5.4; 375/108, 111

[56] References Cited

U.S. PATENT DOCUMENTS

| | | | |
|---|---|---|---|
| 3,965,294 | 6/1976 | Renz et al. | 178/69 A |
| 4,566,091 | 1/1986 | Gerard et al. | 369/47 |
| 4,858,235 | 8/1989 | Matsuda et al. | 371/47.1 |
| 4,876,701 | 10/1989 | Sanner | 375/106 |
| 4,959,834 | 9/1990 | Aikawa et al. | 371/47.1 |
| 5,163,069 | 11/1992 | Hayashi | 371/47.1 |
| 5,282,211 | 1/1994 | Manlick et al. | 371/5.4 |

FOREIGN PATENT DOCUMENTS

| | | |
|---|---|---|
| 0321837 | 6/1989 | European Pat. Off. |
| 0336336 | 10/1989 | European Pat. Off. |
| 2359716 | of 0000 | Germany |
| 4111176C1 | 4/1991 | Germany |

OTHER PUBLICATIONS

"Design and Performance of an Experimental Millimeter Wave PCM-AM Repeater", Noda et al, Review of the Electrical Communication Lab., vol. 19, No. 4, Apr. 1971, pp. 540-547.

"The Measurement of the Error Rate of Digital Transmission Systems", Telecommunications & Radio Eng. vol. 32/33 No. 10, Oct. 1978, Alekseyev, et al, pp. 54-57.

A. F. Harrison, "Measuring Equipment for Date Transmission Channels" Philips Telecommunication Review, vol. 27, No. 1, Aug. 67, pp. 1-10.

*Primary Examiner*—Hoa Nguyen
*Attorney, Agent, or Firm*—Herbert Dubno

[57] ABSTRACT

A method of and a circuit arrangement for detecting synchronization of two word sequences between a measurement signal and a reference signal. The signals are applied to an exclusive OR-gate comparator whose output produces an error signal which is compared with an error signal shifted by one period. This comparison is effected by an exclusive OR-gate and in the case of coincidence, indicating that the measurement and reference signals are phase-shifted, a new synchronization is enabled. The output of the exclusive OR-gate is an error signal which is time-shifted in a shift register and multiplexer so that the time shifted bit sequence is compared with the bit sequence of the first error signal in a second exclusive OR-gate which is connected to an AND-gate for detecting coincidence and generating a further synchronization signal which is processed through counters, another AND-gate and a flip-flop to produce the synchronization signal which is applied to the reference pattern generated.

3 Claims, 2 Drawing Sheets

METHOD OF AND CIRCUITRY FOR DETECTING SYNCHRONISM FAILURE OF TWO WORD SEQUENCES

This is a continuation of application Ser. No. 07/896,129 filed on Jun. 9, 1992, now abandoned.

FIELD OF THE INVENTION

My present invention relates to a method of detecting a synchronism failure of two word sequences and also relates to circuitry for carrying out that method. More particularly, the invention relates to a system in which two word sequences are formed between a measurement signal and a reference signal which in a nondefect state and in undisturbed synchronous operation have the same bit sequence and the same period duration, the measurement signal and the reference signal are compared with one another by means of an exclusive-OR circuit and the output signal of the exclusive-OR circuit is applied to the reference pattern generator, for example, as a synchronization pulse.

BACKGROUND OF THE INVENTION

For the testing of digital communication paths and the devices along these paths, measurement signals are used which, as a test pattern, utilize a bit sequence. The bit sequence can be a quasi-random sequence or a digital word.

At the receiver side, i.e. at the end of the path opposite that at which the test pattern is injected, a measuring device is provided which generates a reference signal with the same quasi-random sequence or with the same digital word.

The receiver measurement signal is compared with the reference signal generated at the receiver side to enable perturbations or defects along the path to be detected.

A bit-error measurement can only be carried out with precision when the received measurement signal and the reference signal are synchronized. In the use of quasi-random sequences as test patterns in bit-error measuring devices, the so-called Gelbrich process, as described in DE-C-2359716 inhibits the new synchronization of the receiver side reference patterns even in the case of high error levels or cluster errors.

In the publication Harrison, A. F.: "Measuring Equipment for Data Transmission Channels." in: Philips Telecommunication Review Vol. 27, Aug. 1, 1967, Pages 1 to 10, a process is described which permits detection of a synchronism failure between two quasi-random sequences rather than bit sequences in the form of digital words. The synchronization of measurement signals and reference signals which are constituted as sequences of digital words (word sequences) poses a problem in that the received word sequence forming the reference pattern must also be synchronized. Individual digital words have a short periodic pulse pattern with a predetermined length which generally is between 2 and 16 bits or also between 2 and 32 bits. The pulse pattern and its length can be established at will by the device user.

For the transmitter and receiver, however, completely identical patterns must be generated to allow the reference pattern at the receiver to be used for pattern comparison with the measurement pattern.

At the beginning of a bit-error measurement, the reference pattern must be synchronized to the transmitted or captured pattern which is the measurement signal. As a criterium for new synchronization, the bit-error rate or proportion has been used heretofore. Upon exceeding a predetermined error proportion, a new synchronization of the reference pattern is initiated. With cluster errors, during which a very high error proportion can arise over a very short interval, new synchronization can be initiated which may not be necessary and the bit-error measurement can thus be interrupted or falsified.

OBJECTS OF THE INVENTION

It is, therefore, the principal object of the present invention to provide a process for detecting the synchronism failure of two word sequences in which the occurrence of cluster errors will not as a rule trigger new synchronization of the reference pattern signals.

Another object of this invention is to provide an improved method of detecting synchronism failure of two word sequences between a measurement signal and a reference signal, whereby drawbacks of earlier systems are avoided.

SUMMARY OF THE INVENTION

These objects and others which will be come apparent hereinafter are attained, in a method of detecting synchronism failure of two word sequences between a measurement signal and a reference signal with the same bit sequence and same period duration and an undisturbed synchronous operation which comprises the steps of:

(a) comparing the measurement signal and the reference signal in an exclusive-OR circuit and producing therein an error signal (FS1);

(b) synchronizing a source of the reference signal with a synchronization pulse formed by the error signal (FS1);

(c) comparing an actual bit sequence of the error signal (FS1) with a time-shifted bit sequence (FS2) offset by the period duration of the reference signal;

(d) upon coincidence of the actual bit sequence of the error signal (FS1) and the time-shifted bit sequence (FS2) compared in step (c), generating a further synchronization signal; and (e) enabling initiation of a new synchronization of the source with the further synchronization signal.

A circuit arrangement for detecting such synchronism failure can comprise:

a source of the reference signal;

a first exclusive-OR circuit having respective inputs receiving the measurement signal and the reference signal and generating an first error signal at an output thereof;

a first AND-gate having one input connected to the output of the first exclusive-OR circuit and an output connected to the source for synchronizing the source;

a counter having an input connected to the output of the first exclusive-OR circuit and receiving the first error signal therefrom;

a shift register having an input connected to the output of the first exclusive-OR circuit and receiving the first error signal therefrom;

a second exclusive-OR circuit having a first input connected to the output of the first exclusive-OR circuit and receiving the first error signal therefrom, and a second input receiving from the shift register a delayed error signal with a time delay from the first error signal at the output of the first exclusive-OR circuit equal to one period thereof;

a second counter having a reset input connected to the output of the first exclusive-OR circuit and receiving the first error signal therefrom;

a second AND-gate having a first input connected to an output of the second exclusive-OR circuit;

a third counter having a reset input connected to an inverter output of the second AND-gate;

a third AND-gate having a first input connected to an output of the first counter, a second input connected to an output of the second counter with inversion, and a third input connected to an output of the third counter, the output of the first counter being connected simultaneously to a second input of the second AND-gate; and a flip-flop having a set input connected to an output of the third AND-gate, a reset input connected to the output of the second counter, and an output connected with a second input of the first AND-gate for supplying synchronization-enabling signals thereto.

An exclusive-OR circuit in the system of the invention compares the captured measurement signal and the reference pattern signal and, upon a synchronism failure, will produce an error signal whose actual bit sequence is compared with a bit sequence offset in time by the period duration of the reference pattern signal. If there is coincidence in this latter comparison, the reference pattern signal must indeed coincide as to its bit sequence with the captured measurement signal but is phase shifted relative thereto. The reference pattern signal in this case is shifted by one bit for each bit error until synchronism between the captured measurement signal and the reference pattern signal is achieved.

Upon the occurrence of cluster errors, a coincidence between the actual error signal and the error signal shifted by one period in time is not detected so that an error accumulation as a consequence of cluster errors does not falsify the synchronization. Cluster errors which do arise thus have no detrimental effect on the synchronization of the reference pattern signal.

With the circuitry described, all stochastically arising error structures from possible synchronism losses can be distinguished. Only error structures which constantly arise with the same period duration as the period of the reference pattern signals and which include at least two errors per pattern period can generate an undesired new synchronization. As a practical matter this is highly improbable and the receiver will in such case remain asynchronous as with the prior processes.

BRIEF DESCRIPTION OF THE DRAWING

The above and other objects, features and advantages of the present invention will become more readily apparent from the following description, reference being made to the accompanying drawing in which.

DETAILED DESCRIPTION OF THE EMBODIMENTS

Figure 1:
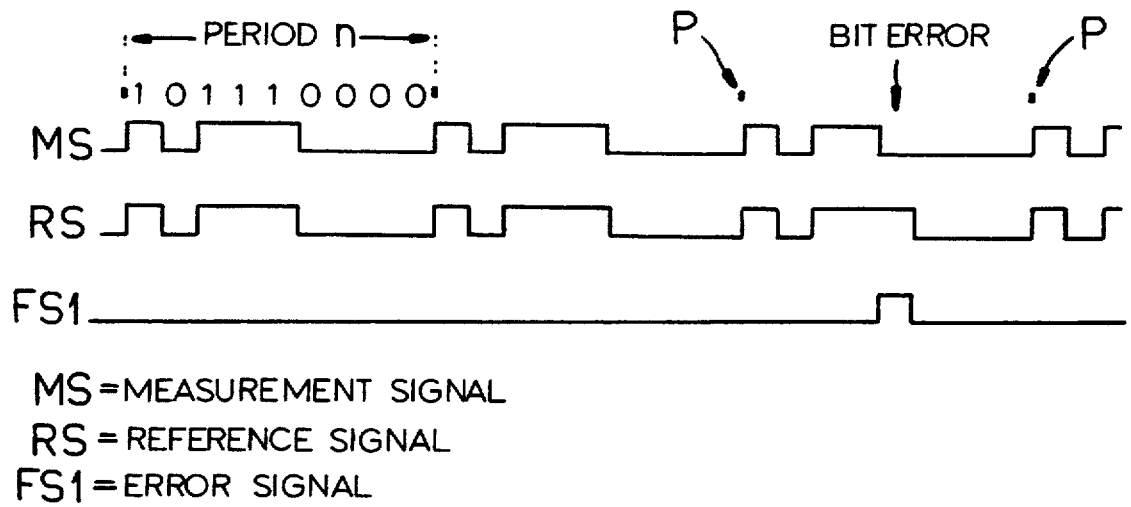
FIG. 1 is a diagram showing the bit pattern of a received or captured measurement signal and the reference pattern signal synchronized therewith as well as the error signal resulting from the occurrence of a single bit error.
Figure 2:
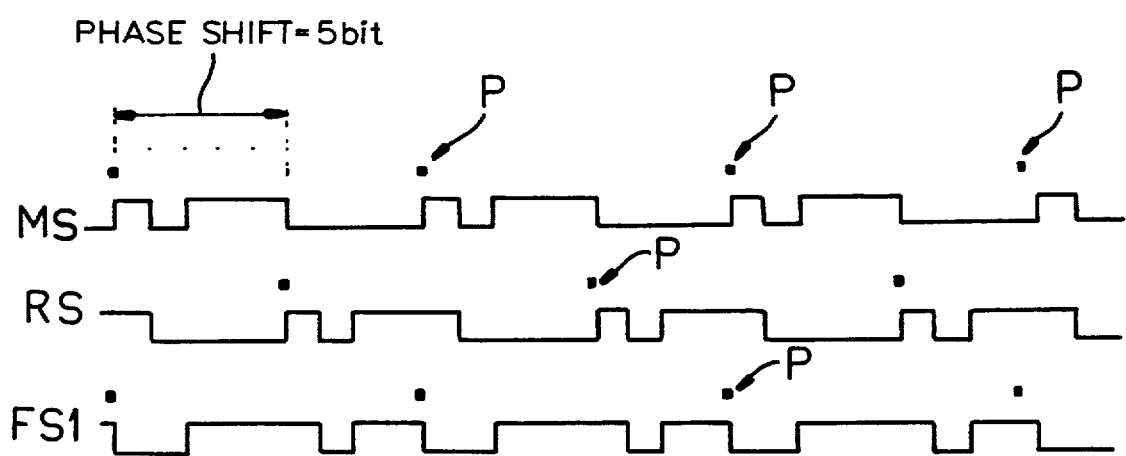
FIG. 2 is a corresponding timing diagram showing the signals of FIG. 1 wherein, however, the reference pattern signals are asynchronous With respect to the received measurement signals.

Before the signals in FIGS. 1 and 2 are further described, it should be noted that the measurement signals and the reference pattern signals will be asynchronous with respect to one another when the pattern of the measurement signal is shifted by m bits relative to the reference pattern where $0<m<n$. n is understood to be a number of bits per pattern period. Since the two patterns are identical in their pulse sequence and have the identical period (period duration or period length) in the case of an asynchronous relationship, for a bit-for-bit comparison, an error pattern can result whose period also has the length n.

This characteristic serves as the basis for the process described herein whereby an asynchronous state between two patterns of the measurement signal and the reference pattern signal is detected.

The error pattern of the error signal is fed directly with a shift by n bits (a lag) to a bit-for-bit comparator. Since in a pulse pattern with a period length n, a retardation by n bits generates the identical pattern, at the input of this second comparator the two bit sequences in the asynchronous case are completely identical.

If the further comparator 9 is an exclusive-OR circuit, then this circuit will supply a low signal at its output as a criterion for the new synchronization. This further comparator 9 has been indicated at 9 in FIG. 3.

A further characteristic of the asynchronous state of two digital words is that at least two errors per pattern period are generated. In this state, a further criterium for the new synchronization is provided so that the new synchronization can be effected only when both criteria are fulfilled.

For the new synchronization, it can be a further condition that the two criteria must be maintained over a predetermined number of pattern periods without interruption. The greater this number of pattern periods which is selected, the greater is the reliability of operation against unnecessary new synchronization. However this condition means that any required new synchronization will occur later in time.

In FIG. 1 the case of a single bit error has been illustrated. In the pattern of the received measurement signal, there is a point indicated as a "bit error" and which is a "zero" or low value where a "one" or higher value would be expected. If the two signals are provided at the inputs of an exclusive-OR circuit 3, the illustrated error signal FS1 will arise at its output. In FIGS. 1 and 2, the measurement signal is represented at MS, the reference signal at RS, the period boundaries at P and the signal sequence at 1.n has been illustrated. If the measurement signal MS and the reference signal RS are present as shown in FIG. 2 with a five bit phase shift, the error signal FS1 of this Figure will result. This error signal has the same period duration as the measurement signal and the reference signal. The beginning and end of the periods is represented by the dots P.

Figure 3:
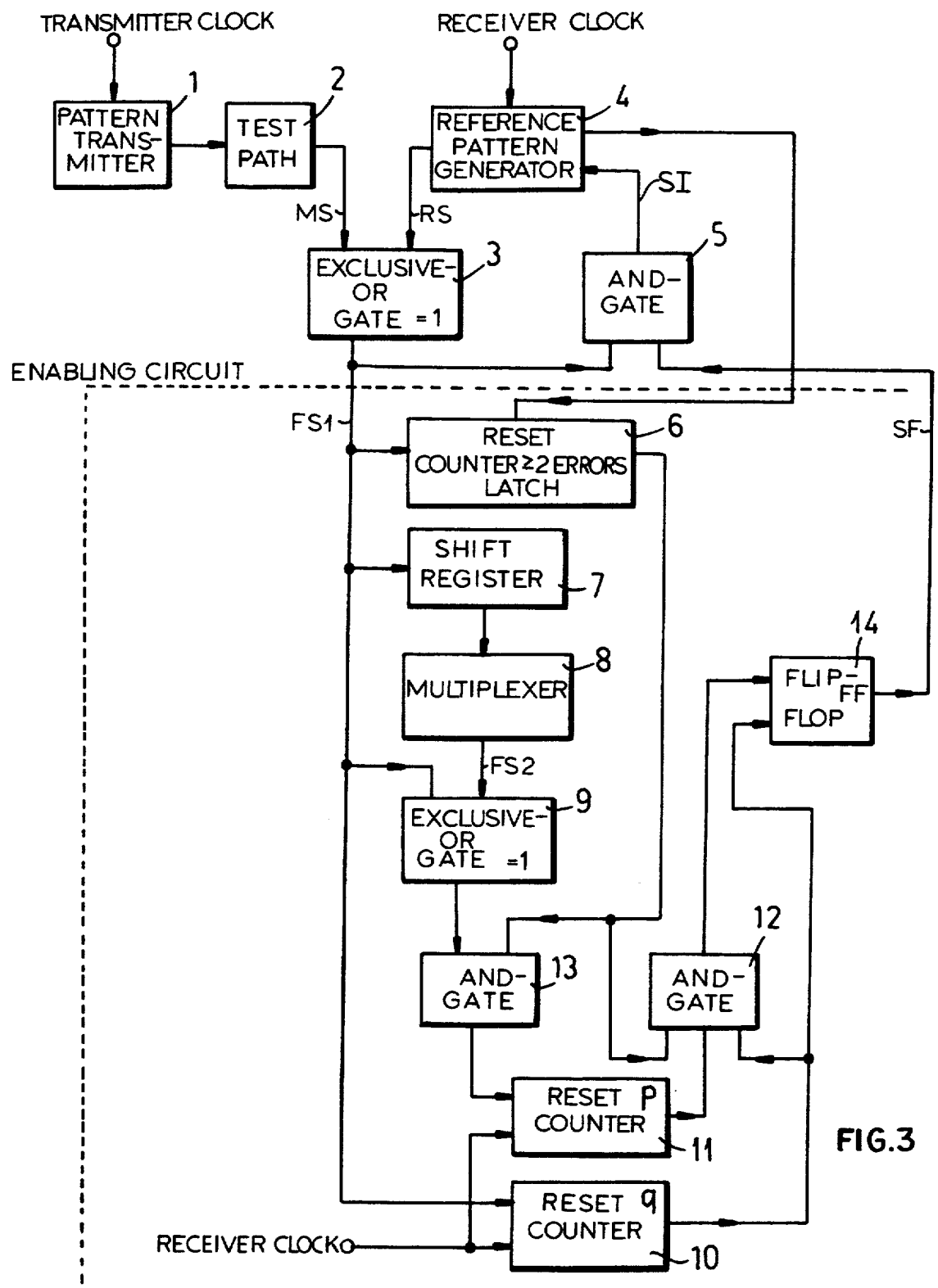
FIG. 3 is a block diagram of the circuitry of the invention.

The circuitry of the invention comprises, as can be seen from FIG. 3, a pattern transmitter 1 transmitting its pattern through a test path 2 delivering the measured signal MS to one input of an exclusive-OR gate 3.

The second input of this exclusive-OR gate receives the reference signal RS from a reference pattern generator. The pattern transmitter 1 receives the transmitter clockwise the reference pattern generator has a receiver clock. The reference signal generator has been represented at 4 in FIG. 3.

Aside from the devices 1 and 2, other conventional devices can be provided for testing to ensure that, at the receiver side, the reference signal generator will produce a reference pattern identical to that of the transmitted pattern. Both the measurement signal and the reference signal are comprised of digital words with a length n. The two signals are compared bit-for-bit in an exclusive-OR circuit 3 operating as a bit-for-bit comparator.

At the output of the exclusive-OR circuit 3, for each bit error, a pulse is provided to a number of units which form an enabling circuit. In addition, the error signal is delivered to one input of an AND-gate 5 which will be described in greater detail below.

The other units include a counter 6, a shift register 7, one input of a further exclusive-OR gate 9 and a reset input of a counter 10.

The counter 6 detects when at least two errors per sample period arise. The trigger signal of the reference pattern which is comprised of one pulse per sample period is applied to the counter 6 to reset the latch to "zero" as represented by the line connecting the reference pattern generator to the "Reset" input of latch 6. In subsequent discussions, the counter and its latch, both represented at 6, will be simply referred to as a counter.

The number of stages of the shift register corresponds to the maximum length n of the digital words. The steps (n/2+1) through n are connected with the multiplexer 8 which passes the shift register signal of length n to the exclusive-OR gate 9. For digital words whose length is less than or equal to n/2, the smallest possible stages of the multiplexer 8 are used which corresponds to an integral value of the word length.

| Example | |
|---|---|
| Maximum word length: | $\underline{n}$ = 32 bits |
| Shift register length: | 32 bits |
| Range of multiplexer: | stages 17 to 32 |
| Set word length: | 3 bit: |
| Multiplexer switching: | stage 18 |

The exclusive-OR gate 9 forms a second comparator which compares the share signal outputted by the first exclusive-OR gate 3 at FS 1 with a time-delayed share signal FS2 and outputs a low signal in case the two sequences at the inputs of this second exclusive-OR gate 9 are identical.

This is the case when the measurement signal MS is either synchronous with or shifted by a constant phase shift to the reference signal RS. To differentiate between these two cases, a counter 11 is provided in addition to the counter 10 and in conjunction with an AND-gate 12. With bit errors or different patterns, at the output of the exclusive-OR gate 9, there is a high pulse.

The output of the exclusive-OR gate 9 is connected with an inverter input of an AND-gate 13 whose inverter output is connected with the reset input of counter 11. When a low signal is produced by the AND-gate 13, the counter 11 can be raised to its maximum counter state p by upcounting. This counter 11 will remain at its maximum counter state until a high signal applied to its reset input resets it to "zero".

The counter 10 counts to g and, like counter 11, is protected against overcounting. Error pulses from the exclusive-OR gate 3 set it back to "zero".

Coincidence at the AND-gate 12 sets a flip-flop 14 so that a high signal arises at its output to enable the new synchronization of the reference pattern to reference signal RS. Each error pulse from the exclusive-OR gate 3 shifts the reference pattern by one bit relative to the pattern of the measurement signal MS.

The flip-flop 14 is reset when the counter 10 reaches its maximum count g. This blocks a new synchronization of the reference pattern. For this purpose, the counter 10 is connected to the reset input of flip-flop 14.

The flip-flop 14 is connected at its output side with a second input of the AND-gate 5 whose output is the synchronization pulse SI which is applied to the reference signal generator 4.

It should be noted that the counter 6 will only apply a high signal to the AND-gates 12 and 13 connected thereto when the counter 6 during a sample period counts two or more errors.

The circuit elements 6 to 14 form an enabling circuit which via the flip-flop 14 applies a synchronization-enabling signal SF to the AND-gate 5 when a phase shift is detected between the measurement signal MS and the reference signal RS.

Three typical operational conditions can be distinguished:

(a) Measurement signals MS and reference signal RS are synchronous with one another and no bit errors are detected.

At the output of the exclusive-OR circuit 3, there is a low signal. As a result:

Counter 6 is reset by the trigger signal and remains at "zero" since no error pulse is applied to its input. Its output is a low signal. At the output of multiplexor 8 is a statically low signal.

At the output of the exclusive-OR circuit 9 there is a statically low signal

At the output of gate 13 there is a statically high signal which resets the counter 11 so that the latter has a low signal output.

Counter 10 is blocked in its maximum count g and has a high signal output.

At counter 12 there is no coincidence so that its output remains a low signal.

Flip-flop 14 remains reset and gives a low signal at its output.

New synchronization is blocked and possible error pulses have no effect on the reference pattern.

(b) Measurement signal MS and reference signal RS are synchronous with one another. However stochastically arising bit errors are detected.

At the exclusive-OR gate output at each bit error, there arises a high pulse. The following is the effect:

When two or more bit errors occur during one sample period, counter 6 goes high at its output. Otherwise its output remains at a low state. At the output of the multiplexer 8, the error pattern arises delayed by the word length.

At the input of the exclusive-OR gate 9, different error patterns are applied and at its output a pulse pattern is generated which is dependent upon the error structure FS1.

At the output of the gate 13, a pulse pattern arises which is dependent upon the error signal and sporadically resets the counter 11 which, depending upon the error state, is represented by a low or high signal. Each error pulse sets the counter 10 to "zero".

At gate 12 no coincidence is detected and its output remains at a low signal level.

In the absence of errors, counter 6 outputs a low signal state and counter 10 reaches its maximum count before counter 11, the maximum counts in both cases representing high states at the outputs.

Flip-flop 14 remains reset and has a low signal at its output.

New synchronization is blocked and possible error pulses have no effect on the reference pattern.

(c) Measurement signal MS and reference signal RS are initially synchronized with one another but because of an offset of the transmitted signal, a new synchronization must be instituted.

The state of the circuit in the synchronous case has been described at (a). If the measurement signal shifts because of a perturbation imposed in the test path 2, there is an offset between two patterns which are applied to the exclusive-OR gate 3.

As a result of this offset, there appears at the output of the exclusive-OR gate 3, an error pattern FS1 with the same period duration as the pattern and at least two error pulses per period.

As a result, the counter 6 outputs a high signal.

At the output of the multiplexer 8, there appears the error pattern FS2 shifted by the word length n from the shift register 7.

The two error patterns FS1 and FS2 at the input of the exclusive-OR gate 9 are in this case identical and there appears at the output of the exclusive-OR gate 9 a statically low signal.

At the counter 13 there is coincidence, so that at its inverter output, a low signal obtains. The counter 11 can then count up to its maximum count P and at its output appears a high signal. Counter 10 is reset with each error pulse and thus produces a statically low signal at its output.

Because input signals are applied to the AND-gate 12, the latter produces an output which sets the flip-flop 14 to enable the new synchronization. With each error pulse, the exclusive-OR gate produces a pulse which results in a pulse at the input of the gate 5, enabled as described above so that the AND-gate 5 applies a synchronization pulse to the reference pattern generator 4 to shift the reference pattern by one bit relative to the measurement signal. This continues until both patterns are again synchronous.

When synchronization occurs, the circuit returns to the state (a).

I claim:

1. A method of detecting synchronism failure of two word sequences between a measurement signal and a reference signal generated by a reference pattern generator with the same bit sequence and same period duration in an undisturbed synchronous operation, said method comprising the steps of:

(a) comparing said measurement signal and said reference signal generated by said reference pattern generator in an exclusive-OR circuit and producing therein an error signal (FS1), said error signal (FS1) having a synchronization pulse and having an actual bit sequence;

(b) synchronizing said reference pattern generator to said synchronization pulse of said error signal (FS1);

(c) generating a time-shifted bit sequence from said error signal (FS1) by offsetting said reference signal by a period duration of said reference signal from said actual bit sequence;

(d) comparing said actual bit sequence of said error signal (FS1) with said time-shifted bit sequence offset by the period duration of said reference signal for detecting coincidence of the actual bit sequence of said error signal (FS1) and the time-shifted bit sequence;

(e) upon coincidence of the actual bit sequence of said error signal (FS1) and the time-shifted bit sequence compared in step (d), generating a further synchronization signal; and (f) returning to step (b) for synchronizing said reference pattern generator to said further synchronization signal upon continuity of coincidence between the actual bit sequence of said error signal (FS1) and the time-shifted bit sequence compared in step (d) for a predetermined number of bits.

2. A circuit arrangement for detecting synchronism failure of two word sequences between a measurement signal and a reference signal with the same bit sequence and same period duration in an undisturbed synchronous operation, said circuit arrangement comprising:

a reference pattern generator constituting a source of said reference signal;

a first exclusive-OR circuit having respective inputs receiving said measurement signal and said reference signal and generating a first error signal at an output thereof;

a first AND-gate having one input connected to said output of said first exclusive-OR circuit and an output connected to said reference pattern generator constituting said source of said reference signal, for synchronizing said reference pattern generator;

a first counter having an input connected to said output of said first exclusive-OR circuit and receiving said first error signal therefrom;

a shift register having an input connected to said output of said first exclusive-OR circuit and receiving said first error signal therefrom;

a multiplexer having an input connected to an output of said shift register, said multiplexer having an output;

a second exclusive-OR circuit having a first input connected to said output of said first exclusive-OR circuit and receiving said first error signal therefrom, and a second input connected to said output of said multiplexer and receiving from said multiplexer a delayed error signal delayed in the shift register and fed to said multiplexer by said shift register with a time delay from the first error signal at said output of said first exclusive-OR circuit equal to one period thereof;

a second counter having a reset input connected to said output of said first exclusive-OR circuit and receiving said first error signal therefrom;

a second AND-gate having a first input connected to an output of said second exclusive-OR circuit;

a third counter having a reset input connected to an output of said second AND-gate;

a third AND-gate having a first input connected to an output of said first counter, a second input connected to an output of said second counter, and a third input connected to an output of said third counter, said output of said first counter also being connected to a second input of said second AND-gate; and a flip-flop having a set input connected to an output of said third AND-gate, a reset input connected to said output of said second counter, and an output connected to a second input of said first AND-gate for supplying signals thereto and which upon coincidence with signals applied to said first AND-gate by said first exclusive-OR circuit. synchronize said reference pattern generator thereto.

3. A method of detecting synchronism failure of two word sequences between a measurement signal and a reference signal with the same bit sequence and same period duration in an undisturbed synchronous operation, said method comprising the steps of:

generating said reference signal in a reference pattern generator;

comparing, in a first exclusive-OR circuit having respective inputs receiving said measurement signal and said reference signal, said measurement signal with said reference signal and generating a first error signal at an output of said first exclusive-OR circuit;

synchronizing said reference signal by providing a first AND-gate having one input connected to said output of said first exclusive-OR circuit and an output connected to said reference pattern generator;

providing a first counter having an input connected to said output of said first exclusive-OR circuit and receiving said first error signal therefrom;

generating a time-shifted bit sequence which is offset by a period duration of said reference signal from an actual bit sequence of said first error signal in a shift register having an input connected to said output of said first exclusive-OR circuit and receiving said first error signal therefrom;

combining outputs of said shift register to form a single output in a multiplexer connected to said shift register and having an output, said multiplexer combining said outputs of said shift register;

supplying from said output of said multiplexer a delayed error signal to a second exclusive-OR circuit having a first input connected to said output of said first exclusive-OR circuit and receiving said first error signal therefrom;

providing a second counter having a reset input connected to said output of said first exclusive-OR circuit and receiving said first error signal therefrom;

connecting a first input of a second AND-gate to an output of said second exclusive-OR circuit for detecting a coincidence of the actual bit sequence of said first error signal with said time-shifted bit sequence of said delayed error signal to generate a further synchronization signal;

providing a third counter having a reset input connected to an output of said second AND-gate;

providing a third AND-gate having a first input connected to an output of said first counter, a second input connected to an output of said second counter, and a third input connected to an output of said third counter, said output of said first counter being connected simultaneously to a second input of said second AND-gate; and supplying synchronization signals to said generator from a flip-flop having a set input connected to an output of said third AND-gate, a reset input connected to said output of said second counter, and an output connected with a second input of said first AND-gate.

* * * * *